United States Patent [19]
Winter et al.

[11] Patent Number: 5,208,444
[45] Date of Patent: May 4, 1993

[54] ELECTRICAL CONNECTORS FOR ELECTRICALLY HEATED VEHICLE WINDOWS

[75] Inventors: John A. Winter, Pittsburgh; Bruce A. Bartrug, Lower Burrell; Harry S. Koontz, Pittsburgh, all of Pa.

[73] Assignee: PPG Industries, Inc., Pittsburgh, Pa.

[21] Appl. No.: 607,947

[22] Filed: Nov. 1, 1990

[51] Int. Cl.⁵ .............................. H05B 3/10; B60L 1/02
[52] U.S. Cl. ..................................... 219/547; 219/522; 219/541; 219/203; 338/322
[58] Field of Search ............... 219/547, 522, 543, 203, 219/541; 439/845, 849, 850, 877, 878, 879, 880, 881, 882, 917; 174/84 C, 194 R; 338/322, 326, 329

[56] References Cited

U.S. PATENT DOCUMENTS

| | | | |
|---|---|---|---|
| 3,496,520 | 2/1970 | Reynolds | 439/442 |
| 3,745,309 | 7/1973 | Gross | 219/203 |
| 4,032,751 | 6/1977 | Yootsey et al. | 219/538 |
| 4,100,398 | 7/1978 | Levin | 219/541 |
| 4,278,875 | 7/1981 | Bain | 219/522 |
| 4,320,286 | 3/1982 | Borrup | 219/549 |
| 4,323,726 | 4/1982 | Criss et al. | 174/68.5 |
| 4,425,021 | 1/1984 | Nicolino | 219/543 |
| 4,610,771 | 9/1986 | Gillery | 204/192.1 |
| 4,786,784 | 11/1988 | Nikodem et al. | 219/543 |
| 4,808,799 | 2/1989 | Schave | 219/522 |
| 4,820,902 | 4/1989 | Gillery | 219/203 |
| 4,829,163 | 5/1989 | Rausch et al. | 219/547 |
| 4,994,650 | 2/1991 | Koontz | 219/497 |
| 4,997,396 | 3/1991 | Gold et al. | 439/801 |
| 5,040,994 | 8/1991 | Nakamoto et al. | 439/76 |

FOREIGN PATENT DOCUMENTS 2826720 1/1979 Fed. Rep. of Germany ...... 219/541

Primary Examiner—Bruce A. Reynolds
Assistant Examiner—Michael D. Switzer
Attorney, Agent, or Firm—Andrew C. Siminerio

[57] ABSTRACT

A terminal connector for a heated window, a heated window provided with a plurality of terminal connectors constructed and arranged for simultaneous engagement to corresponding terminals of a multiple terminal housing and a method of assembling a heated window provided with at least two of said terminal connectors in a terminal connection area along a side edge of said heated window.

10 Claims, 1 Drawing Sheet

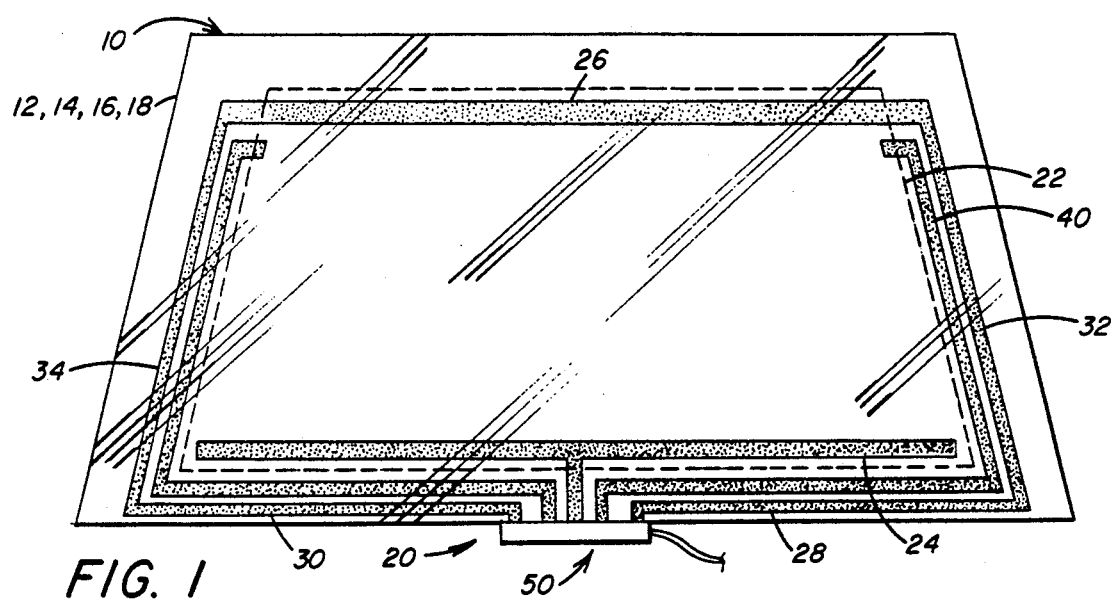
FIG. 1
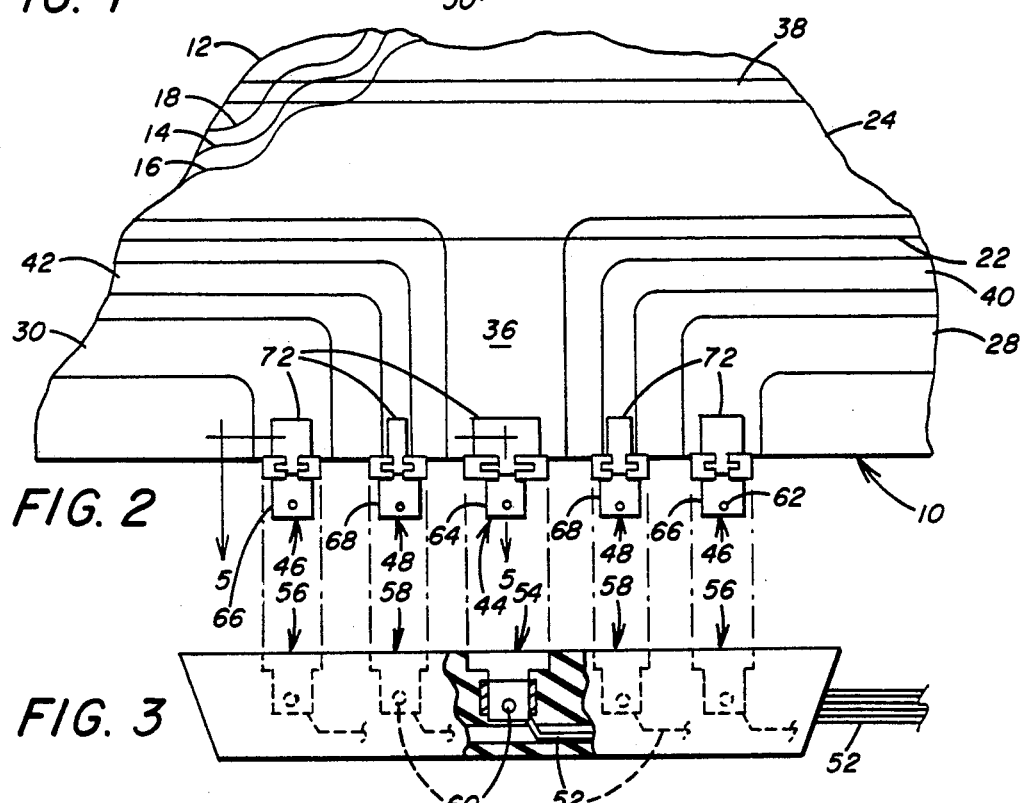
FIG. 2
FIG. 3
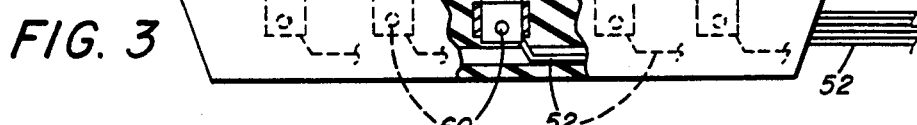
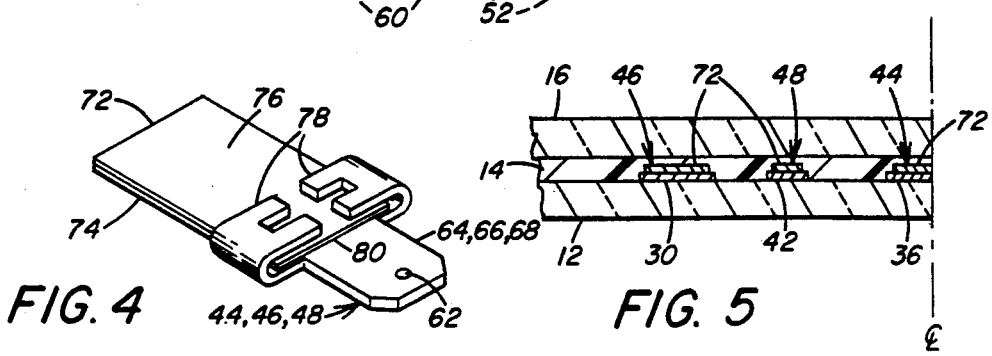
FIG. 4 FIG. 5

ELECTRICAL CONNECTORS FOR ELECTRICALLY HEATED VEHICLE WINDOWS

FIELD OF THE INVENTION

This invention relates to electrical connectors for electrically heated vehicle windows and particularly windows having a plurality of connectors constructed and arranged for connection to a multiple terminal housing for use with a harness for an electric power source for said vehicle.

BACKGROUND OF THE INVENTION AND RELEVANT ART

Electrically heated windows have been used in vehicles to defrost or defog a transparent element comprising the window. An electrical resistance element, preferably in the form of a thin transparent metal or metal oxide electroconductive film on a transparent surface is connected to a source of electric power through a pair of bus bars. The prior art also developed a detector circuit for certain of these heated windows to alert vehicle occupants of a defective condition that may make the heating circuit inoperative, e.g. a crack or other discontinuity in the heating circuit's bus bars.

Prior to this invention, each bus bar was connected individually to a lead line unique for said bus bar, regardless of whether the bus bar was part of a transparent heating circuit for the window or incorporated in a detector circuit. Each bus bar was connected within the outline of the window to the inner end of a first terminal that extended outside the window for individual connection to an external terminal which is connected to a generator or alternator or some other electromotive source. The first terminal was laminated into the window prior to shipment to an assembly plant where each first terminal was separately attached to an external terminal corresponding to each first terminal in a time consuming operation. Some of the developments in this art prior to this invention are recited in a description of various patents that follows.

U.S. Pat. No. 4,100,398 to Levin provides a connective tab 50 of electroconductive metal embedded in an edge portion of a window. An external terminal portion of tab 50 extends outside the edge of the window for connection to a single wire harness when the window is assembled at a vehicle assembly plant. The terminal connections are encased within a sleeve of heat-shrinkable material. While the assembly at a vehicle assembly plant is accomplished in less time than an assembly that involves soldering, this patent requires that a separate connection step be performed for each bus bar.

U.S. Pat. No. 4,278,875 to Bain shows heated aircraft windows in which bus bars 24 and 26 of one embodiment and 48 and 50 of another embodiment extend from opposite sides of one end of the respective windows. Inherently, each bus bar must be secured to an external electroconductive terminal in a separate operation. In U.S. Pat. No. 4,320,286 to Barrup and U.S. Pat. No. 4,323,726 to Criss et al., the ends of bus bars also extend from the outline of windows by a spacing approximating the width dimension of the windshield, which inherently requires a separate connecting step for each bus bar.

U.S. Pat. No. 4,786,784 Nikodem, et al. shows a heated windshield with a pair of electrical leads that can be attached to connector sections 21 and 23, respectively, for connection to a vehicle's electrical system using separate connecting steps for each connector section. This patent suggests that a portion of glass sheet 14 and intermediate sheet 13 must be cut out in order to provide good solder joint strength between leads 25 and 26 and connector sections 21 and 23.

U.S. Pat. No. 4,808,799 to Schave and U.S. Pat. No. 4,829,163 to Rausch et al. show separate connections for bus bars 28 and 32 of a heating circuit and to sense line 36 of a crack detector circuit, and separate connections 24 and 26 to bus bars 20 and 22 and a sensor terminal 36 for a sensor conductor 34, respectively. Each of these patents needs to make at least three separate exterior connections.

U.S. Pat. No. 4,820,902 to Gillery discloses a dual feed bus bar arrangement for a heated transparency. A jumper wire makes it possible to reduce to two the number of leads extending from the windshield to the power source, but it extends outside the windshield enroute from one lower end to the other lower end of the extensions for the upper bus bar thus exposing the heated windshield to possible breakage of the jumper wire during certain handling steps involved in the fabrication of the windshield, particularly when it includes a roller prepress step. There is no teaching of constructing and arranging the bus bars and their terminal connections to connect them to corresponding terminal connectors for the poles of the electric power source other than separately.

A copending application, U.S. Ser. No. 07/591,917 to Bartrug et al., filed Oct. 2, 1990 reduces the likelihood of breaking the jumper wire by having the jumper wire extend between the ends of the extensions of the upper bus entirely within the margin of the windshield and laminating the entire length of the jumper wire between the windshield's glass sheets. The teachings in this copending application is incorporated by reference in this specification.

BRIEF DESCRIPTION OF THIS INVENTION

According to a preferred embodiment of this invention, electroconductive extensions of the bus bars for the heating circuit of a heated transparency, and also for an optional bus bar discontinuity detection circuit, are constructed and arranged to be located in spaced relation to one another within a localized non-conductive terminal connecting area. A metal foil strip male terminal connector is secured to each bus bar within a unique preselected portion of said non-conductive terminal connecting area. A positioning template or jig may be used to accurately position the connectors. Each terminal connector also includes an electroconductive blade or tab electrically interconnected to the foil strip which extends beyond the edge of the transparency. A multiple terminal housing constructed and arranged with multiple terminals sized and spaced to correspond to the sizing and spacing of each said terminal connector tab can be applied to the outer ends of the terminal connector tabs simultaneously to provide simultaneous connections to the heating circuit and/or the detector circuit. An electrical power source means within a vehicle has terminals to which the multiple terminal housing can be readily connected.

While the male terminal connectors are preferably adhered by a layer of electroconductive adhesive to electroconductive extensions for the bus bars within the non-conductive terminal connecting area, these connections can also be effected by soldering, although soldering may involve some danger of causing internal glass stresses that may cause breakage.

It is preferred that the male terminal connectors be applied to one of a pair of unnotched glass sheets to avoid the need for a glass notching step. However, this invention may also be practiced with a pair of transparent sheets wherein at least one of the sheets is notched and may even be used with a pair of glass sheets having different sized aligned notches.

While this invention has male terminal connector tabs or blades that are not connected simultaneously to the multiple terminal housing until after the window is delivered to a vehicle assembly plant, it is also within the concept of this invention to simultaneously attach the terminals of the multiple terminal housing to the corresponding terminal connector tabs or blades before shipment to a vehicle assembly plant so as to provide a preassembled heatable transparency and terminal housing unit.

It is also within the gist of this invention to incorporate the male terminal connectors in heated windows that also incorporate insulated electroconductive bus bar jumpers that electrically interconnect the ends of two ended bus bars within the non-conductive terminal connecting area, thereby reducing the number of male terminal connectors and corresponding terminals in the multiple terminal housing that have to be interconnected simultaneously.

This invention also incorporates a method of assembling and fabricating a heated windshield with a detector circuit having electrical connectors constructed and arranged to make simultaneous engagement with corresponding terminals of a multiple terminal housing regardless of whether the multiple terminal housing is part of the window assembly shipped to a vehicle assembly plant or is a separate article from the assembled and fabricated window.

The benefits of this invention will be better understood in the light of a description of embodiments thereof that follows.

DESCRIPTION OF DRAWINGS

FIG. 1 is a frontal view of a heated vehicle window having a heating circuit and optional bus bar discontinuity detecting circuit susceptible of using the present invention with parts broken away to show interior layers of the window and incorporating a multiple terminal housing connected thereto, but omitting terminal connectors for the bus bars and said multiple terminal housing.

FIG. 2 is an enlarged frontal view of a terminal connection area along an edge portion of the heated vehicle window of FIG. 1, emphasizing a plurality of end portions of bus bars for electroconductive circuits and showing male terminal connectors comprising elements of said heated window that are omitted from FIG. 1.

FIG. 3 is a partial cutaway view of a multiple terminal housing shown in spaced aligned relation to said terminal connection area and showing how the multiple terminal housing is constructed and arranged with female terminal connectors constructed and arranged to make simultaneous contact with corresponding male terminal connectors of FIG. 2 when the multiple terminal housing engages said edge portion of said window.

FIG. 4 is an isometric view of a typical male terminal connector used with this invention.

FIG. 5 is a sectional view taken along line 5—5 of FIG. 2.

DETAILED DESCRIPTION OF THE INVENTION

The particular embodiment of the present invention illustrated in FIGS. 1, 2, and 5 is shown in combination with a heatable windshield having an electric field detector circuit to detect discontinuities in the bus bars as disclosed in U.S. Ser. No. 07/444,206 to Kootz, filed Dec. 1, 1989, which teachings are hereby incorporated by reference. The detailed description of this preferred embodiment shows a laminated transparency comprising two plies of glass bonded together by a plastic interlayer typical of present day commerical windshields. However, the invention may apply to heated transparencies having a single ply of glass laminated with a single ply of plastic, all plastic laminations and other combinations involving numerous plies. The transparencies may be used for aircraft windows, windows for other vehicles, and other enclosures.

The embodiment of FIGS. 1, 2, and 5 shows a transparency 10 comprising an outboard glass sheet 12, a plastic interlayer 14 such as plasticized polyvinyl butyral commonly used for laminated windshields or other suitable interlayer material, and an inboard glass sheet 16. An electroconductive coating 18 is preferably placed on an unexposed surface, most preferably on the inbound surface of outer glass sheet 12. Many coatings exhibit the combination of transparency and electroconductivity needed for the heating element of the transparency. A preferred coating comprises a film of silver between films of zinc stannate, disclosed in U.S. Pat. No. 4,610,771 to Gillery, the disclosure of which is incorporated herein by reference. The films are applied by magnetic sputtering in sequence. The silver film acts as a conductive layer, exhibiting appropriate resistivity for a heated windshield when its thickness is on the order of 110 angstroms, while the zinc stannate films mask the reflectance of the silver.

In the embodiment illustrated in FIGS. 1, 2 and 5 the electrical connections are shown located in a terminal connection area 20 at the central portion of the lower edge portion of the windshield 10. However, the terminal connection area 20 can be located along any edge and at any off-center location, even at a corner portion.

FIG. 2 is partly broken away to show outboard glass sheet 12, interlayer 14, inboard glass sheet 16 and electroconductive coating 18. The coating terminates with a deletion line 22, as shown in FIGS. 1 and 2.

As seen in FIG. 1, a bottom bus bar 24 and a top bus bar 26 are in contact with coating 18. The uncoated margin outside deletion line 22 permits connections to upper bus bar 26 without contact with coating 18. Two conductive strips 28 and 30 extend in opposite directions from terminal connection area 20 (FIG. 1) along the bottom edge portion of the transparency 10 to electroconductive side strips 32 and 34 which extend along the opposite side portions of the transparency to connect strips 28 and 30 to opposite ends of upper bus bar 26. Strips 28, 30, 32 and 34 comprise electroconductive extension means for upper bus bar 26. A conductive strip 36 extends from bottom bus bar 24 to comprise electroconductive extension means for bottom bus bar 24.

An opaque border 38 is optionally applied by screen printing a ceramic enamel to the inboard surface of either or both glass sheets to conceal attachment means and bus bars incorporated in the transparency.

In transparencies having bus bar discontinuity detector circuits 40 and 42, as disclosed in U.S. Ser. No. 07/444,206, the latter terminate within the terminal connection area 20 outside the deletion line 22 of coating 18.

Bus bars 24 and 26, crack detector circuits 40 and 42 and electroconductive extension means 28, 30, 32, 34 and 36 are made of well known ceramic frit material containing finely divided silver which may be silk screened onto the glass surface or onto opaque border 38 (shown only in FIG. 2) and fused by heating. The conductivity of the bus bars and the electroconductive extension means is made considerably greater than that of coating 18.

The uncoated marginal areas outside deletion line 22 may be created by masking those areas during the coating process. Optionally, the entire sheet may be coated and the coating subsequently deleted from marginal areas. Since the uncoated marginal areas include the terminal connection area 20 where the electroconductive extension means 28, 30 and 36 and the end of each detection circuit 40 and 42 are located, a terminal can be applied seperately to each extension means or each detection circuit (two being shown in the illustrative embodiment) in spaced relation to each other applied terminal. Therefore, each terminal is insulated from each other terminal when the terminals are connected to different bus bars or electroconductive extension means in the terminal connection areas 20.

In an illustrative embodiment of this invention as shown in FIG. 2, a special terminal 44 is provided for electroconductive extension means 36, a special terminal 46 is provided for each electroconductive extension means 28 and 30 and a special terminal 48 is provided for each crack detector circuit 40 and 42. The details of the construction, arrangement and operation of the terminals 44, 46 and 48 will be described later.

This invention differs from the prior art patents by incorporating a multiple terminal housing 50 having a plurality of wires 52, a different one extending from a different one of several female socket connections 54, 56 and 58. Female socket connection 54 cooperates with a corresponding terminal 44 bonded to electroconductive extension 36 for lower bus bar 24. One or two female socket connections 56 cooperate with one or two corresponding terminals 46 bonded to bottom electroconductive extensions 28 and 30 of upper heater circuit bus bar 26. One or two female socket connections 58 cooperate with one or more corresponding terminals bonded to either or both corresponding detector circuits 40 and 42, if the latter are included in the heated windshield 10. Instead of having a different lead wire extending from each of said bus bar extensions for individual solder connections to one or more outside circuits, this invention provides novel terminals 44, 46 or 48 that include electroconductive portions that are constructed and arranged to make simultaneous connections with corresponding terminals 54, 56 or 58, respectively, carried by the multiple terminal housing 50 shown in FIG. 3.

FIG. 3 shows how female socket connections 54, 56 and 58 are of channel construction are constructed and arranged with detents 60 to mate with holes 62 of corresponding male terminal connectors 44, 46 or 48, as will be discussed later. Each connector is affixed, preferably by bonding using an electroconductive organic adhesive layer in a manner to be explained later, at terminal connection area 20 of the heated window. The male terminal connectors include tab 64 for terminal connector 44, tab 66 for terminal connectors 46 and tab 68 for terminal connectors 48, respectively, that are constructed and arranged to match the channel construction and spacing arrangement of the corresponding female socket connections 54, 56 and 58, respectively, of multiple terminal housing 50 so that the spacing between the adjacent male terminal connectors 44, 46 and 48 is identical to the spacing between corresponding adjacent of said female terminal connections 54, 56, and 58. Tabs 64, 66 and 68 should be sufficiently rigid so as to retain their structural integrity if the housing 50 is repeatedly connected to and removed by the tabs will be discussed later Also, each of the tabs 64, 66 and 68 extend outward from a wide shoulder portion 70 at an outer end of an electroconductive strip 72. Although not limiting in the present invention, the strip 72 may be tinned copper foil or copper foil reinforced with silver. An electroconductive adhesive 74 (such as Chomerics catalog number CCK-XX-101-0100) covers an inner portion 76 of the strip 72 for adhering it to a corresponding electroconductive extension within terminal connecting area 20 along a lower edge portion of the windshield 10. A removable masking tape (not shown) covers electroconductive adhesive 74 until the terminal is ready to be applied to a corresponding bus bar or bus bar extension means to make an electrical connection between strip 72 and its associated electroconductive extension means.

It is important that each male terminal connector 44, 46 and 48 be applied in the proper position to each corresponding circuit element and also be oriented properly so that its tab 64, 66 or 68 extends simultaneously into a corresponding female terminal connection 54, 56 or 58, respectively. In order to insure proper positioning and alignment, a jig or template (not shown) is provided with guide openings constructed and arranged in a manner corresponding to the construction and arrangement of the female terminal connections 54, 56 and 58 of multiple terminal housing 50 and aligned over the terminal connection area 20 properly to guide the application of electroconductive strip 72 to different circuits. Aperture 62 in each male terminal connector 44, 46 and 48 receives a detent 60 of corresponding female terminal connector 54, 56 and 58, respectively, that insures that each male terminal connector fits snugly with its corresponding female terminal connector and yet allows ready separation when desired.

In the preferred embodiment of this invention, neither glass sheet (the term glass being used to include any transparent glazing material such as transparent plastics such as polycarbonates and acrylics as well as transparent glass) nor flexible interlayer is notched. Also, each male terminal connector is preferably adhered by pressure application through its electroconductive adhesive ply 74 to its corresponding electroconductive extension means of its corresponding heating circuit or its corresponding detecting circuit, if the window incorporates the latter, although connection by the less desired manner of attachment such as by soldering and the like is not ruled out.

It is contemplated to utilize a jumper connection for each circuit insulated from other circuits, such as shown in U.S. Ser. No. 07/591,917, to make possible the reduction in the number of male terminal connectors needed to simultaneously connect each heating circuit or detection circuit to corresponding terminals of the multiple terminal housing. Thus, for a window having a heating circuit and no detection circuit, a minimum of two male terminal connectors 44 and 46 is sufficient, and for a window having both a heating circuit and a detection circuit, the use of jumper connections makes it possible for a terminal housing containing female terminal connectors to require only three male terminal connectors 44, 46 and 48 for the circuits to be connected to the power means instead of the five male and five female terminal connectors shown in FIGS. 2 and 3.

Although not limiting in the present invention, in one particular embodiment, each male terminal connector used to electrically connect a heating circuit bus bar or bus bar extension or detector circuit includes a strip 72 of electroconductive material such as copper foil approximately 0.10 mm. thick and 12 mm. long with silver particles embedded in the copper and a layer 74 of electroconductive adhesive on the copper foil with a layer of strippable tape (not shown) protecting said electroconductive adhesive layer 74. If desired, thicker foil or other electroconductive materials may be used for strip 72 provided they do not interfere with the fabrication of the windshield 10, which will be discussed later more in detail. More particularly, it is preferred that the thickness of the strip 72 be no more than the thickness of interlayer 14 after lamination. Tabs 64, 66 and 68 are several times as thick as strip 72, for example, about 0.76 mm., and extend about 9 mm. long from the outer end of each pad. Shoulder portion 70 of each tab includes members 78 which are folded around an exposed end 80 of strip 72, that preferably is free of electroconductive adhesive layer 74, and crimped to connect the end 80 to the tabs 64, 66 and 68. Although not limiting in the present invention, in the particular embodiment shown in FIG. 4, the ends 80 are bifurcated to receive solder in the areas therebetween, if required, to secure the tabs to the strips.

METHODS OF FABRICATION

Although not limiting in the present invention, a laminated heated windshield incorporating the teachings of this invention, may be fabricated according to the following steps:

1. Cut a pair of glass sheets in outline to slightly different dimensions so that the outer sheet will be slightly longer than the inner sheet of the pair, wherein the edge outlines match after the sheets are bent in unison.
2. Smooth the edges of the glass sheets by sanding or fire polishing.
3. Pair each outer glass sheet to a corresponding inner glass sheet to form a pair.
4. Screen print a black ceramic enamel band to the marginal portion of what will be the inner surface of the outer glass sheet, hereafter called the #2 surface (the four glass surfaces of the pair of glass sheets being numbered consecutively from the outermost surface of the outer glass sheet (#1 surface) to the innermost surface of the inner glass sheet (#4 surface).
5. Heat the outer sheet to fire and fuse the black enamel onto the #2 surface of the flat outer glass sheet.
6. Screen print the bus bar and detector circuits over the fired ceramic enamel and/or #2 glass surface using a conventional ceramic-silver composition.
7. Heat the outer sheet to fire and fuse the ceramic-silver composition onto the ceramic band and/or glass surface.
8. Applying parting material between the glass sheets to keep the glass sheets separate during a subsequent glass sheet heating and bending operation.
9. Assemble the pair of glass sheets over a bending mold with the larger glass sheet facing the mold and the #2 surface of the larger glass sheet facing upward.
10. Shape the pair of glass sheets while so assembled on said bending mold.
11. Separate and wash the bent glass sheets.
12. Apply a mask to a portion of the #2 surface.
13. Cathode sputter an electroconductive coating on the unmasked portion of the #2 surface.
14. Remove the mask.
15. If desired, apply an insulated jumper bar member(s) that electrically interconnect the ends of the bus bars of the heating circuit and/or the detector circuit, to reduce the number of terminal connectors.
16. Position a jig, template or other alignment device having a guiding area corresponding to each electroconductive extension of the heating circuit and detector circuit, if such is present, to be electrically interconnected to a male terminal connector at a terminal connection area of said #2 surface, and apply the male terminal connector after its strippable protective tape is removed, to the proper position on the corresponding bus bar or electroconductive strip 72 to secure the corresponding electroconductive member with and its tab 64, 66 or 68 extending beyond the outer end of the glass sheet in a desired orientation unique for each tab.
17. Apply a sheet of flexible interlayer material over the #2 surface of the outer glass sheet of the said pair of bent glass sheets.
18. Assemble the inner glass sheet of said pair of bent glass sheets over said interlayer to form a laminating assembly.
19. Laminate the assembly to form a unitary structure using standard production procedures to adhere the glass sheets to said interlayer as are well known in the art.

If it is desired to ship the laminated heated window 10 with a multiple terminal housing 50 to a vehicle assembly plant, the multiple terminal housing 50 is applied to the tabs of said male terminal connectors as shown in FIG. 1 in such manner that each tab makes simultaneous engagement with a corresponding female terminal connector of said multiple terminal housing.

If the multiple terminal housing 50 is to be applied to the heated windshield 10 at a later time, e.g. at a vehicle assembly plant, the edge of the heated window 10 may be protected by a waterproof silicon seal (not shown) in the vicinity of the terminal connection area 20. The silicon seal may be applied before the prepressing and laminating steps.

It is also within the scope of this invention to notch the inner glass sheet 16 and the interlayer 14 in the terminal connection area 20 as disclosed in U.S. Ser. No. 07/375,090 to Winter et al., filed Jul. 3, 1989, which teachings are hereby incorporated by reference. If this is done, the notched area is filled with a protective material such as a silicone or flexible epoxy (not shown) that protects and reinforces the tabs of the male terminal connectors.

Although the particular embodiment of the terminal connector 44, 46 and 48 shown in FIGS. 2 and 4 and discussed above includes both a strip 72 and tab 64, 66 or 68, respectively, it is contemplated that a single unitary structure may be used for the terminal connector.

More particularly, such a connector may be a flat electroconductive member or may have an elevated central portion as disclosed in U.S. Pat. No. 3,634,654 to Peetz. As can be readily appreciated, the thickness of the connector within the periphery of the windshield 10 is of less importance when the connectors are applied at a notched portion of the windshield as disclosed earlier since, in the latter situation, the thickness does not have to be less than the thickness of the interlayer 14 after lamination because it will not be positioned between the glass sheets 12 and 16 and interfere with the laminating process.

In conformance with the requirements of the patent statutes, the inventors have described and illustrated the present invention and have recited what is now considered to be a preferred embodiment of this invention. It is understood that various modifications of this described invention will become obvious in the light of the aforesaid description and that the scope of this invention for which patent protection is sought is defined by the claimed subject matter that follows.

What is claimed is:

1. In a heated window assembly for a vehicle of the type having a first transparent sheet laminated to a second transparent sheet, a terminal connection area along one edge portion of said assembly, a first bus bar having first electroconductive extension means extending along an interior major surface of said first sheet into said terminal connection area, a second bus bar having second electroconductive extension means electrically insulated from said first electroconductive extension means and extending along said major surface of said first sheet and into said terminal connection area, and an electroconductive heating member extending between and electrically interconnecting said first and second bus bars, the improvement comprising:

a first terminal connector including a strip having an inner portion overlapping said first extension means within said terminal connection area and laminated between said first and second sheets to electrically connect said first electroconductive extension means with said first terminal connector, and a second terminal connector including a strip having an inner portion overlaying said second extension means within said terminal connecting area and laminated between said first and second sheets in close proximity to said first terminal connector to electrically connect said second electroconductive extension means with said second terminal connector, wherein each strip of said terminal connectors further include an outer portion extending outwardly from said assembly at said terminal connection area, said connectors being spaced along said edge portion of said assembly at said terminal connection area to allow simultaneous engagement of said outwardly extending portions with a corresponding terminal of a multiple terminal housing having at least two terminals constructed and arranged in close proximity to each other simultaneously receive each of said outwardly extending portions of said terminal connectors.

2. The improvement as in claim 1 wherein each of said terminal connectors include an electroconductive tab extending from and electrically interconnected and secured to said outer portion of said strip and constructed and arranged to extend into and engage a unique one of said terminals carried within said multiple terminal housing.

3. The improvement as in claim 2 further including a bus bar discontinuity detector circuit having third electroconductive extension means insulated from said first and second electroconductive extension means and extending into said terminal connection area, and a third terminal connector including a strip having an inner portion overlapping said third extension within said terminal connection area and laminated between said sheets in close proximity to said first and second terminal connectors to electrically connect said detector circuit with said third terminal connector and an outer portion extending outwardly from said assembly at said terminal connection area, said terminal connections being constructed and arranged such that said three terminal connectors make simultaneous engagement with a corresponding terminal of said multiple terminal housing.

4. The improvement as in claim 2 further including an electroconductive adhesive applied to said inner portion of said strip to secure said connector to said corresponding one of said extension means.

5. The improvement as in claim 4 wherein each of said tabs includes a transverse shoulder portion wider than said strip which abuts said edge portion of said assembly at said terminal connection area, said shoulder portion including a pair of end portions inwardly folded around said outer portion of said strip and extending toward the transverse center of said strip and means to affix said inwardly folded end portion of said shoulder portion to said strip.

6. The improvement as in claim 5 wherein said inwardly folded end portions are crimped to secure said tab to said strip.

7. The improvement as in claim 6 wherein said inwardly folded end portions of said shoulder portion are bifurcated to form regions to receive solder between said bifurcated regions to secure said tab to said strip.

8. The assembly as in claim 1 wherein said electroconductive heating member is a transparent electroconductive coating.

9. In a method of connecting at least two bus bars of a heated window assembly to a multiple terminal housing having at least two terminals constructed and arranged in a predetermined manner, said window assembly being of the type having a first transparent sheet laminated to a second transparent sheet, a terminal connection area along one edge of said assembly, a first bus bar having first electroconductive extension means extending along an interior major surface of said first sheet and into said terminal connection area, a second bus bar having second electroconductive extension means electrically insulated from said first electroconductive extension means and extending along said major surface of said first sheet and into said terminal connection area and an electroconductive heating member extending between and electrically interconnecting said first and second bus bars, the improvement comprising:

laminating terminal connectors between said sheets in such a manner that a strip portion of each of said terminal connectors is positioned within said window assembly in overlaying relation to a corresponding one of said electroconductive extension means within said terminal connection area to electrically interconnect said terminals with a corresponding extension means and a tab portion of each of said terminal connectors extends outwardly from said assembly at locations along said edge of said assembly in close proximity to each other at said terminal connection area that enables each of said tab portions to make simultaneous engagement with a corresponding terminal within said multiple terminal housing when said multiple terminal housing is aligned with and connected to said terminal connection area.

10. A method as in claim 9 wherein each of said strip portions include a layer of flexible electroconductive metal and a layer of electroconductive adhesive, and further including the steps of positioning an alignment means at said terminal connection area to indicate a desired predetermined position of each of said terminal connectors wherein said predetermined position for each of said terminal connectors is aligned with the position of a corresponding terminal of said multiple terminal housing and securing each of said strip portions of said terminal connectors to a corresponding one of said extension means at said aligned, predetermined position so as to enable each of said tab portions of said terminal connectors to simultaneously engage a different corresponding terminal carried by said multiple terminal housing when said housing is aligned with and connected to said terminal connection area.

* * * * *